US008607452B2

(12) United States Patent
Crosta et al.

(10) Patent No.: US 8,607,452 B2
(45) Date of Patent: Dec. 17, 2013

(54) METHOD FOR REDUCING SOUND OUTPUT AT THE BACK OF A TURBO ENGINE AND TURBO ENGINE IMPROVED BY THIS METHOD

(75) Inventors: Franck Crosta, Leguevin (FR); Damien Prat, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 1122 days.

(21) Appl. No.: 12/532,397

(22) PCT Filed: Mar. 17, 2008

(86) PCT No.: PCT/FR2008/000348
§ 371 (c)(1),
(2), (4) Date: Sep. 21, 2009

(87) PCT Pub. No.: WO2008/129177
PCT Pub. Date: Oct. 30, 2008

(65) Prior Publication Data
US 2010/0107597 A1    May 6, 2010

(30) Foreign Application Priority Data
Mar. 23, 2007  (FR) ..................... 07 02127

(51) Int. Cl.
*B21K 25/00*  (2006.01)
*F02K 1/00*   (2006.01)
*F02K 1/82*   (2006.01)
(52) U.S. Cl.
USPC .............................. 29/889.2; 60/770; 181/213

(58) Field of Classification Search
USPC ................ 60/39.5, 770, 771, 772, 226.1, 262
See application file for complete search history.

(56) References Cited

U.S. PATENT DOCUMENTS

| 5,167,118 A | 12/1992 | Torkelson |
| 2004/0074224 A1 | 4/2004 | Hebert |
| 2008/0217101 A1 | 9/2008 | Crosta |

FOREIGN PATENT DOCUMENTS

| EP | 1 340 901 A2 | 9/2003 |
| EP | 1 340 901 A3 | 12/2004 |
| FR | 2 885 955 | 11/2006 |

OTHER PUBLICATIONS

International Search Report dated Sep. 10, 2008 w/ English translation.
Written Opinion of the International Searching Authority with English translation.

*Primary Examiner* — Gerald L Sung
*Assistant Examiner* — William Breazeal
(74) *Attorney, Agent, or Firm* — Dickinson Wright PLLC

(57) ABSTRACT

Disclosed is a method for producing a modified aircraft bypass turbojet engine having reduced sound output, in which the method is based on modifying an initial configuration of a rear portion of the turbojet engine to produce a modified rear portion of the turbojet engine. The modified rear portion includes a modified outer convex rear part shaped with a modified concave inner rear part that delimits an intermediate space beyond an initial cold stream outlet orifice. The intermediate space has a thickness at least equal to the thickness (E) of a sound deadening coating, which is placed in the intermediate space.

4 Claims, 3 Drawing Sheets

METHOD FOR REDUCING SOUND OUTPUT AT THE BACK OF A TURBO ENGINE AND TURBO ENGINE IMPROVED BY THIS METHOD

FIELD OF THE INVENTION

The present invention relates to a method for reducing the sound output at the back of an aircraft bypass turbojet engine and to a turbojet engine improved by implementing this method.

BACKGROUND OF THE INVENTION

It is know that bypass turbojet engines comprise a nacelle defining an air inlet at the front and axially containing a cold stream fan, a central hot stream generator and a fan duct of annular section provided, at the rear, with a jet pipe nozzle for said cold stream, and that, in at least some of these turbojet engines:
  said cold stream jet pipe nozzle is formed by an outer fan cowl and by an inner fan cowl of which the initial rear parts are respectively convex and concave and converge toward one another until they meet to form an initial outlet orifice for the cold stream;
  a sound deadening coating of annular section that has to have a preset optimum thickness in order effectively to deaden the noise generated by said fan and carried along in said cold stream, said coating being borne internally by said inner fan cowl at the location where the distance between said converging parts of said inner and outer fan cowls is at least equal to said optimal thickness of the sound deadening coating;
  said hot stream generator is enclosed in an axial engine cowl that has at least approximately the shape of a divergent front conical surface and of a convergent rear conical surface opposing one another on a common base which lies forward of said initial cold stream outlet orifice, the initial jet pipe nozzle throat and the initial cold stream outlet section being delimited between the initial rear part of the inner fan cowl and the rear conical surface of said engine cowl, said rear conical surface comprising, in its rear part, at least one opening which is positioned on the outside with respect to said cold stream initial outlet orifice and which is intended to discharge to the outside a stream of ventilating air bled from said cold stream and introduced into said engine cowl to regulate the temperature of said hot stream generator; and
  said fan duct is delimited between said inner fan duct and said engine cowl.

In a turbojet engine such as this, the rear part of the cold stream jet pipe nozzle may have noise-deadening characteristics that are not optimal because throughout that part of it in which the distance between the converging rear parts of said inner and outer fan cowls is smaller than said optimal thickness of said noise deadening coating, there is no space to house said coating.

SUMMARY OF THE INVENTION

It is an object of the present invention to remedy this disadvantage by allowing a greater area of sound deadening coating to be housed between said convergent rear parts of the inner and outer fan cowls.

To this end, according to the invention, starting out from a turbo jet engine initial status, which turbo jet engine comprises inner and outer fan cowl rear parts, a cold stream outlet orifice, a jet pipe nozzle throat and a cold stream outlet section all arranged in the initial way described hereinabove, the method is notable:
  in that, without making any modifications to said axial engine cowl:
    said concave initial rear part of the inner fan cowl is modified:
      by progressively diverting it away from the axis of said turbojet engine and lengthening it rearward beyond said initial cold stream outlet orifice,
      then by extending it rearward in the form of a convex rear end part the rear edge of which defines a modified cold stream outlet orifice, the latter orifice being positioned near said opening through which the ventilation air is discharged, but forwards thereof, and
      by shaping said convex rear end part in such a way that it, with said rear conical surface of the axial engine cowl, delimits:
        a modified jet pipe nozzle throat the area of which is equal to that of said initial jet pipe nozzle throat, and
        a modified cold stream outlet section the area of which is equal to that of said initial cold stream outlet section; and
    said convex initial rear part of said outer fan cowl is modified:
      by progressively diverting it away from the axis of said turbojet engine and lengthening it rearward to beyond said initial cold stream outlet orifice,
      then by extending it rearward in the form of a concave rear end part the rear edge of which meets said rear edge of said convex rear end part in order jointly to form said modified cold stream outlet orifice, and
      by shaping said modified convex rear part in such a way that it, with the modified concave rear part of the inner fan cowl, delimits an intermediate space of which the thickness is, just beyond said initial cold stream outlet orifice, at least equal to said optimum thickness for said sound deadening coating, and
  in that said sound deadening coating is placed in all of said intermediate space.

Thus, by virtue of such a transverse expansion and such a lengthening of the cold stream jet pipe nozzle it is possible for the axial length (parallel to the axis of said turbojet engine) of the sound deadening coating that can be installed at the periphery of the fan duct to be increased considerably rearward. This then results in excellent reduction in the noise output by the fan at the back of the turbojet engine.

In addition, implementing the method according to the present invention yields the advantageous results that the increase in axial length obtained for the noise deadening coating is greater than the ensuing increase in axial length (distance between the initial and modified cold stream outlet orifices) of the cold stream jet pipe nozzle. Experience has shown that this increase in axial length of the sound deadening coating may be up to 25% greater than the increase in axial length of the cold stream jet pipe nozzle.

It must be pointed out that the modification, according to the present invention, to the convex initial rear part of the outer fan cowl leads to the formation of a zone of inflection where it meets the concave rear end part. The variation in curvature that occurs in this zone of inflection needs not to cause an inversion of the pressure gradient, as this would have the effect of causing boundary layer separation in the rear part of the outer fan cowl. To avoid such a disadvantage, steps are taken to ensure that the shape parameter Hi of the zone of inflection remains lower than 1.6.

Of course, the present invention additionally relates to a turbojet engine that is improved in accordance with the abovementioned method.

BRIEF DESCRIPTION OF THE DRAWINGS

The figures of the attached drawing will make it easy to understand how the invention may be embodied. In these figures, identical references denote elements that are similar.

DETAILED DESCRIPTION OF THE INVENTION

Figure 1:
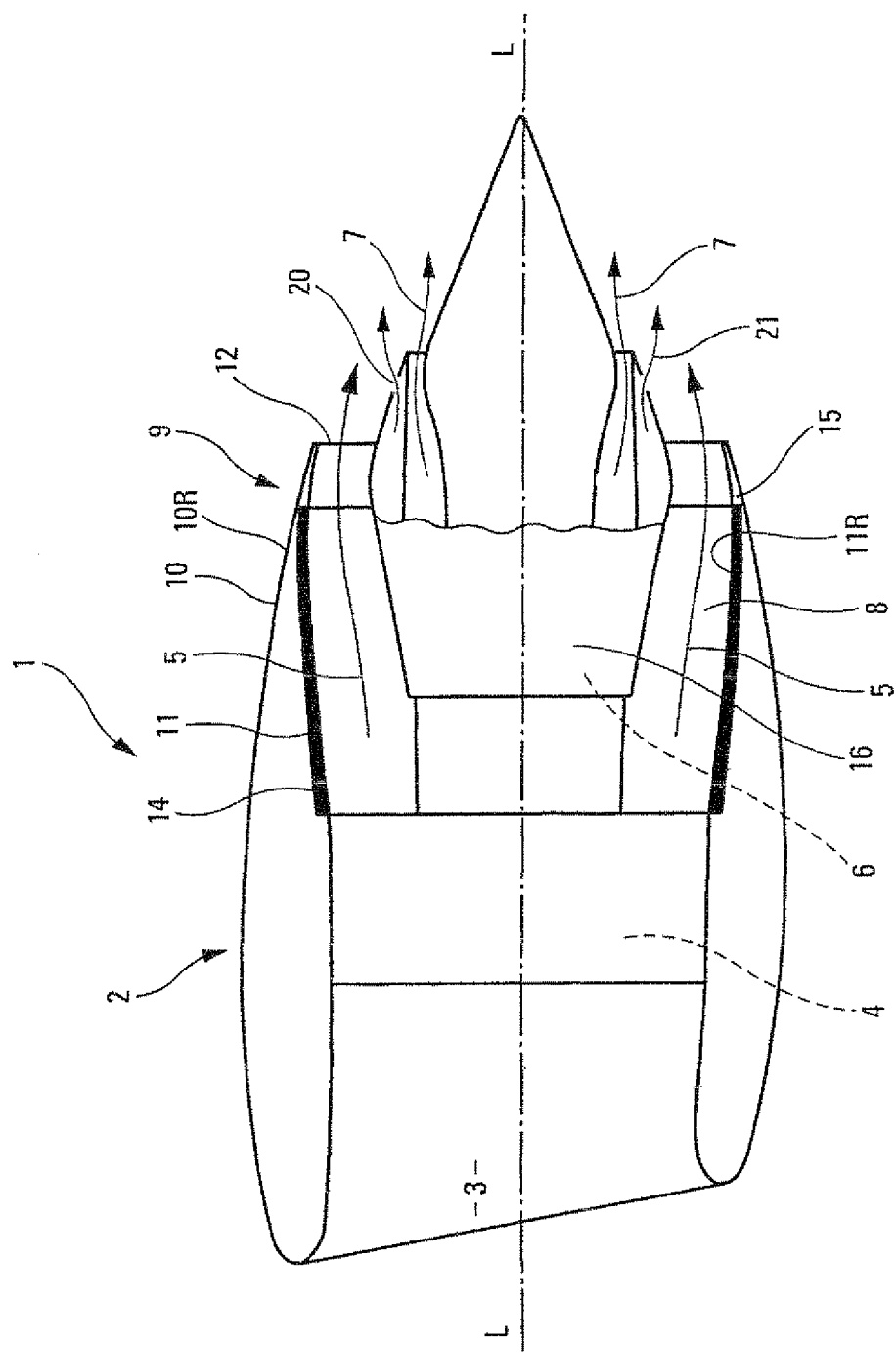
FIG. 1 is a schematic axial section of a bypass turbojet engine.

The bypass turbojet engine 1 of longitudinal axis L-L depicted in FIG. 1 comprises a nacelle 2 delimiting an air inlet 3 at the front and axially containing a fan 4 generating the cold stream symbolized by arrows 5, a central generator 6 generating the hot stream symbolized by arrows 7 and an annular-section fan duct 8 provided with a jet pipe nozzle 9 for said cold stream 5.

Figure 2:
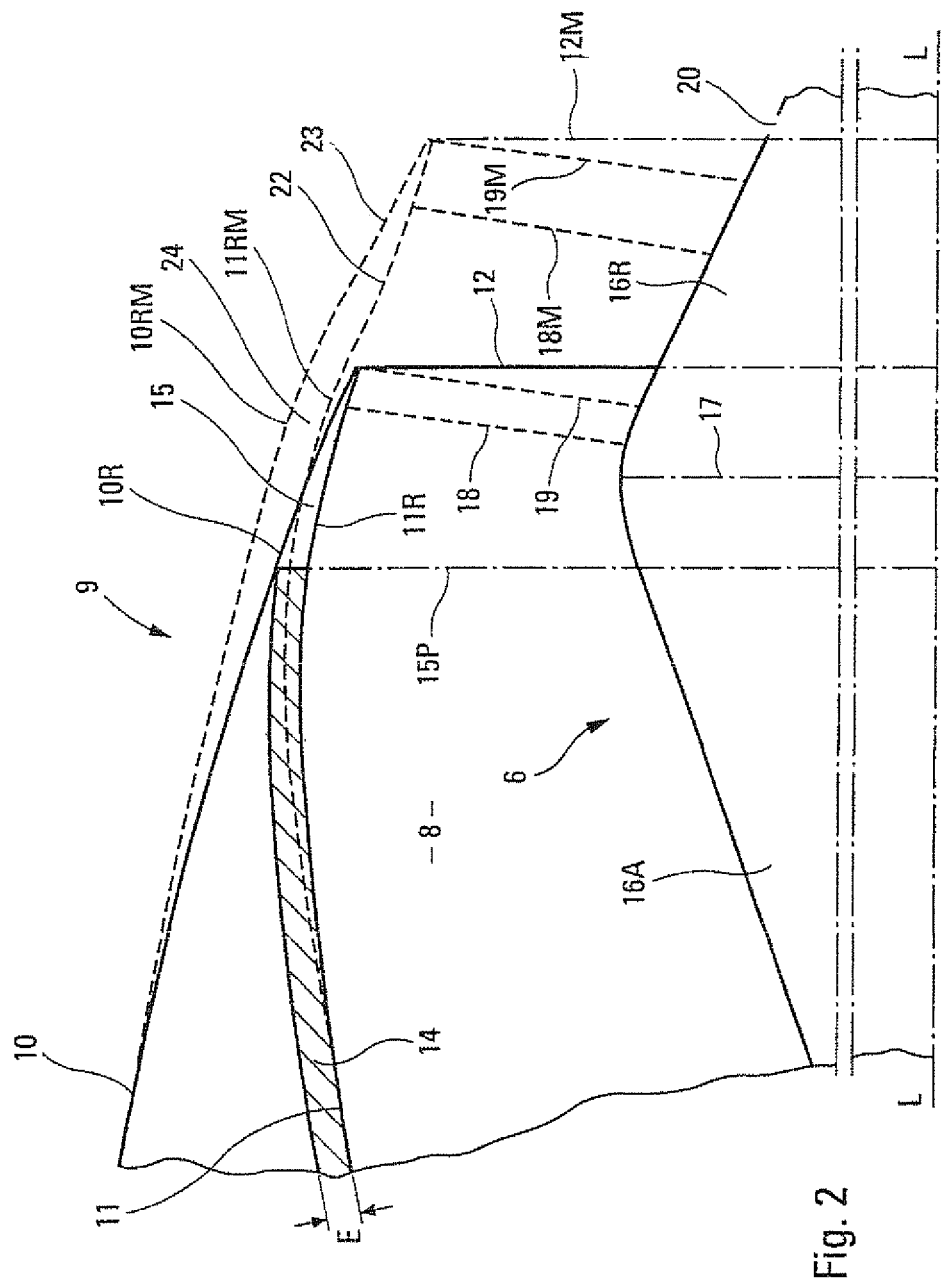
FIG. 2 is a schematic and partial transversely expanded half-section of the rear part of the initial cold stream jet pipe nozzle of the turbojet engine of FIG. 1, the modified rear part being depicted in dotted line.

As also shown, and on a larger scale, in FIG. 2, the cold stream jet pipe nozzle 9 is formed by an outer fan cowl 10 and by an inner fan cowl 11 of which the rear parts 10R and 11R, which are respectively convex and concave, converge toward one another toward the rear to form the cold stream 5 outlet orifice 12.

A noise deadening coating 14, of annular cross section, for example of the known cellular type, is borne internally by the inner fan cowl 11. In order effectively to deaden toward the rear the noise generated by the fan 4 and carried along in the cold stream 5, the sound deadening coating 14 has to have an optimum thickness equal to E. As a result, the sound deadening coating 14 cannot be fitted into the annular rear tip 15 of the nacelle 2, adjacent to the outlet orifice 12 and beginning in the rearward direction at the transverse plane 15P, in which tip the distance between the convergent parts of the cowls 10 and 11 is less than the thickness E.

The hot stream generator 6 is enclosed in an axial engine cowl 16 that has at least approximately the shape of a divergent front conical surface 16A and of a convergent rear conical surface 16R which are opposed to one another on a common base 17 which lies forward of the cold stream 5 outlet orifice 12.

The rear part 11R of the inner fan cowl 11 and the rear conical surface 16R of the engine cowl 16 between them delimit the cold stream 9 jet pipe nozzle throat 18 and the outlet section 19 for said cold stream 5, said throat 18 and said outlet section 19 each being formed by a slightly conical annular surface coaxial with the axis L-L of the turbojet engine 1.

The rear conical surface 16R comprises, to the rear of and on the outside of the cold stream outlet orifice 12, at least one opening 20 (for example in the form of an annular slot) intended to discharge to the outside a ventilation air stream symbolized by the arrows 21 and bled (in a known way that has not been depicted) from the cold stream 5 and introduced into the engine cowl 16 (again in a known way that has not been depicted) in order to regulate the temperature of said hot stream generator 6.

Figure 3:
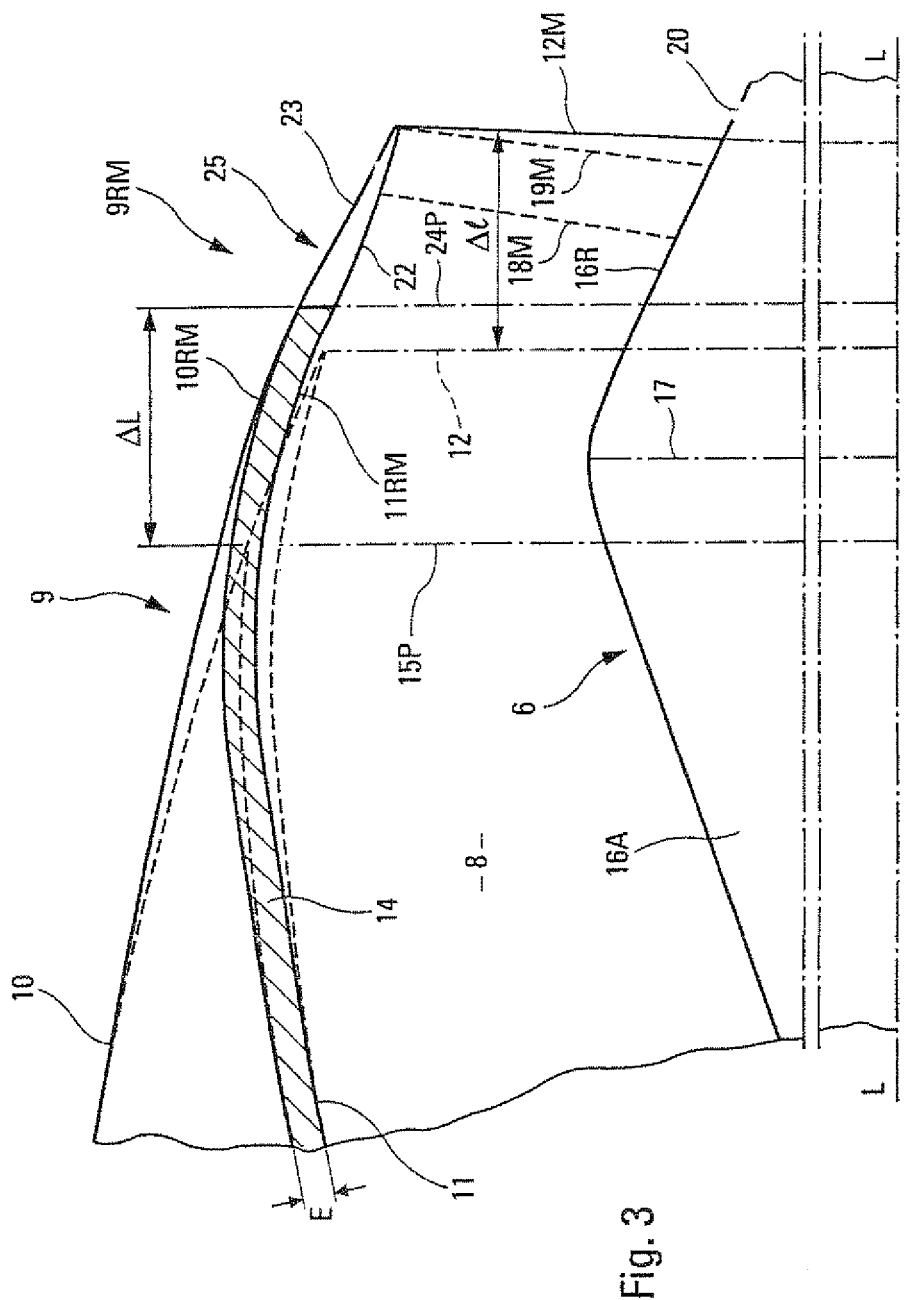
FIG. 3 is a schematic and partial transversely expanded half-section of the rear part of the modified cold stream jet pipe nozzle, said FIG. 3 being comparable with FIG. 2 and the initial rear part being depicted therein in dotted line.

The fan duct 8 is thus delimited between said inner fan cowl 11 (or the sound deadening coating 14) and said engine cowl 16. According to the present invention, in order to be able to increase the length of the sound deadening coating 14, of optimum thickness E, rearward parallel to the axis L-L of the turbojet engine 1 and thus reduce the noise at the rear of said turbojet engine without thereby detracting from engine performance:

no modification is made to the engine cowl 16 of the hot stream generator 6 but, as illustrated by FIG. 2:
said concave initial rear part 11R of the inner fan cowl 11 is modified:
by progressively diverting it away from the axis L-L of said turbojet engine and lengthening it rearward beyond said initial cold stream outlet orifice 12 (see dotted line 11RM),
then by extending it rearward in the form of a convex rear end part 22 the rear edge of which defines a modified cold stream outlet orifice 12M, the latter orifice 12M being positioned near said opening 20 through which the ventilation air is discharged, but forwards thereof, and
by shaping said convex rear end part 22 in such a way that it, with said rear conical surface 16R of the axial engine cowl 16, delimits:
a modified jet pipe nozzle throat 18M the area of which is equal to that of said initial jet pipe nozzle throat 18, and
a modified cold stream outlet section 19M the area of which is equal to that of said initial cold stream outlet section 19; and in addition
said convex initial rear part 10R of said outer fan cowl 10 is modified:
by progressively diverting it away from the axis L-L of said turbojet engine and lengthening it rearward to beyond said initial cold stream outlet orifice 12 (see dotted line 10RM),
then by extending it rearward in the form of a concave rear end part 23 the rear edge of which meets said rear edge of said convex rear end part 22 in order jointly to form said modified cold stream outlet orifice 12M, and
said modified convex rear part 10RM is shaped in such a way that it, with the modified concave rear part 11RM of the inner fan cowl 11, delimits an intermediate space 24 of which the thickness is, just beyond said initial cold stream outlet orifice 12, at least equal to said optimum thickness E for said sound deadening coating 14, and
said sound deadening coating 14 is placed in all of said intermediate space 24, as far as the plane 24P beyond which, rearward, the thickness of said space becomes smaller than the optimum thickness E for the coating 14 (see also FIG. 3).

Thus, the sound deadening coating 14 can extend as far as the transverse plane 24P positioned to the rear of the initial cold stream outlet orifice 12.

In FIG. 3, in which the rear part 9RM of the jet pipe nozzle 9, modified as indicated hereinabove, has been depicted in solid line, with the outline of the initial jet pipe nozzle 9 indicated in dotted line, it may be seen that the lengthening ΔL of the axial length of the coating 14 thus obtained exceeds the lengthening Δl of the jet pipe nozzle in the rearward direction.

It will be noted that, where the modified convex part 10RM and the concave rear end part 23 meet, a profile of inflection 25 is formed on the outer fan cowl. This profile of inflection 25 is additionally shaped in such a way as to cause no boundary layer separation. To do this, the shape parameter Hi of the profile of inflection 25 is chosen to be equal to 1.6 at most.

The invention claimed is:

1. A method for producing a modified aircraft bypass turbojet engine having reduced sound output based on modifying an initial configuration of a rear portion of said aircraft bypass turbojet engine to produce a modified rear portion of said turbojet engine in which the turbojet engine is configured axially about an axis (L-L) and includes a nacelle having an air inlet at a front portion of the nacelle, and which axially contains a cold stream fan for providing a cold stream, a central hot stream generator for providing a hot stream and a fan duct of annular section at a rear portion of the nacelle, with a cold stream jet pipe nozzle for said cold stream, wherein the initial configuration of the turbojet engine is defined as follows:

said cold stream jet pipe nozzle is initially configured at a rear portion of the nacelle, in which the initial cold stream jet pipe nozzle is defined by an initially outer convex-shaped fan cowl and an initially inner concave-shaped fan cowl, wherein the initially outer convex fan cowl and the initially inner concave fan cowl converge toward one another to meet and form an initial outlet orifice for the cold stream;

a sound deadening coating of annular section having a thickness (E), said sound deadening coating located internally of said initially inner concave fan cowl, with the sound deadening coating fitted up to a transverse plane of a rear tip of the nacelle, wherein the rear tip extends in a rearward direction from the transverse plane to the initial cold stream outlet orifice, and the rear tip has a thickness less than said thickness (E) of the sound deadening coating;

said central hot stream generator is enclosed in an axial engine cowl having a divergent front conical surface and a convergent rear conical surface opposing one another relative to a common base in which the common base lies forward of said initial cold stream outlet orifice, with an initial jet pipe nozzle throat and an initial cold stream outlet section being delimited between an initial rear part of the initially concave inner fan cowl and the rear conical surface of said engine cowl, said rear conical surface of said engine cowl comprising at least one ventilation air opening at a rear part of the rear conical surface, positioned outside of said initial cold stream outlet orifice, and which is configured to discharge a stream of ventilating air bled from said cold stream and introduced into said engine cowl to regulate temperature of said hot stream generator; and said fan duct is delimited between said initially inner concave fan cowl and said engine cowl, wherein said method comprises:

modifying said initial rear part of said initially concave inner fan cowl to form a modified inner convex rear part as follows:

progressively diverting said initial rear part of said initially concave inner fan cowl away from the axis (L-L) of said turbojet engine and lengthening said initial rear part of said initially concave inner fan cowl rearward beyond said initial cold stream outlet orifice, extending said initial rear part of said initially concave inner fan cowl rearward to form the modified inner convex rear part, wherein the modified inner convex rear part includes a rear edge that defines a modified cold stream outlet orifice positioned proximate to and forward of said at least one ventilation air opening, and shaping said modified inner convex rear part with said rear conical surface of the axial engine cowl to delimit a modified jet pipe nozzle throat having an area equal to that of said initial jet pipe nozzle throat, and a modified cold stream outlet section having an area equal to that of said initial cold stream outlet section;

modifying an initial rear part of said initially convex outer fan cowl to form a modified outer convex rear part by:

progressively diverting said initial rear part of said initially convex outer fan cowl away from the axis (L-L) of said turbojet engine and lengthening said initial rear part of said initially convex outer fan cowl rearward to beyond said initial cold stream outlet orifice, extending said initial rear part of said initially convex outer fan cowl rearward to form an outer concave rear part having a rear edge which meets said rear edge of said inner convex rear part to form said modified cold stream outlet orifice, and shaping said modified outer convex rear part with the modified concave inner rear part to delimit an intermediate space beyond said initial cold stream outlet orifice, with the intermediate space having a thickness at least equal to said thickness (E) of said sound deadening coating; and placing said sound deadening coating said intermediate space.

2. The method as claimed in claim 1, wherein a profile of inflection is formed between the diverted and lengthened convex rear part of said outer fan cowl, and said extended concave rear end part is configured not to generate boundary layer separation.

3. The method as claimed in claim 2, wherein said profile of inflection has a shape parameter Hi equal to 1.6 at most.

4. A bypass turbojet engine modified according to the method of claim 1.

* * * * *